(12) United States Patent
Wang et al.

(10) Patent No.: US 11,305,646 B2
(45) Date of Patent: Apr. 19, 2022

(54) AUTOMOBILE CHASSIS INTEGRATION CONTROL METHOD AND SYSTEM

(71) Applicant: Guangzhou Automobile Group Co., Ltd., Guangdong (CN)

(72) Inventors: Fuwen Wang, Guangdong (CN); Zhenwen Chen, Guangdong (CN); Qiang Chen, Guangdong (CN); Xiucheng Huang, Guangdong (CN); Shuang Liu, Guangdong (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 64 days.

(21) Appl. No.: 16/336,118

(22) PCT Filed: Oct. 16, 2018

(86) PCT No.: PCT/CN2018/110541
§ 371 (c)(1),
(2) Date: Mar. 25, 2019

(87) PCT Pub. No.: WO2019/119945
PCT Pub. Date: Jun. 27, 2019

(65) Prior Publication Data
US 2021/0370767 A1    Dec. 2, 2021

(30) Foreign Application Priority Data
Dec. 18, 2017   (CN) .......................... 201711363619.9

(51) Int. Cl.
*B60K 23/08*      (2006.01)
*B60R 16/023*     (2006.01)
(Continued)

(52) U.S. Cl.
CPC ...... *B60K 23/0808* (2013.01); *B60R 16/0231* (2013.01); *B60W 10/04* (2013.01);
(Continued)

(58) Field of Classification Search
CPC .......... B60K 23/0808; B60R 16/0231; B60W 10/04; B60W 10/06; B60W 10/119;
(Continued)

(56) References Cited

U.S. PATENT DOCUMENTS

| | | | | |
|---|---|---|---|---|
| 2005/0064989 A1* | 3/2005 | Wakao | .................... | B60K 17/35 477/97 |
| 2015/0096821 A1* | 4/2015 | Arai | ................ | B60W 30/18072 180/233 |
| 2016/0075342 A1* | 3/2016 | Shimizu | ................ | B60W 50/14 701/54 |

FOREIGN PATENT DOCUMENTS

| | | |
|---|---|---|
| CN | 101934743 A | 1/2011 |
| CN | 105857295 A | 8/2016 |

(Continued)

*Primary Examiner* — Edwin A Young
(74) *Attorney, Agent, or Firm* — ScienBiziP, P.C.

(57) ABSTRACT

Provided are an automobile chassis integration control method and system. The control method includes the steps that: a cooperative control unit receives a first engine torque output by an EMS, a first engine torque limiting request output by a four-drive controller, a second engine torque limiting request output by an ESP, and a third engine torque limiting request output by a TCU from a CAN bus respectively; and the cooperative control unit cooperatively controls the first engine torque limiting request, the second engine torque limiting request, the third engine torque limiting request, and the first engine torque, and outputs a second engine torque as an engine execution torque.

13 Claims, 3 Drawing Sheets

---

A cooperative control unit receives a first engine torque output by an EMS, a first engine torque limiting request output by a four-drive controller, a second engine torque limiting request output by an ESP, and a third engine torque limiting request output by a TCU from a CAN bus respectively

↓

The cooperative control unit cooperatively controls the first engine torque limiting request, the second engine torque limiting request, the third engine torque limiting request, and the first engine torque, and outputs a second engine torque as an engine execution torque

(51) Int. Cl.
*B60W 10/04* (2006.01)
*B60W 10/119* (2012.01)
*B60W 30/02* (2012.01)

(52) U.S. Cl.
CPC .......... *B60W 10/119* (2013.01); *B60W 30/02* (2013.01); *B60W 2510/0291* (2013.01); *B60W 2510/107* (2013.01); *B60W 2520/28* (2013.01); *B60W 2520/403* (2013.01); *B60W 2540/10* (2013.01); *B60W 2710/0666* (2013.01); *B60W 2710/10* (2013.01); *B60W 2720/403* (2013.01)

(58) Field of Classification Search
CPC ......... B60W 30/02; B60W 2510/0291; B60W 2510/107; B60W 2520/28; B60W 2520/403; B60W 2540/10; B60W 2710/0666; B60W 2710/10; B60W 2720/403
See application file for complete search history.

(56) References Cited

FOREIGN PATENT DOCUMENTS

| | | |
|---|---|---|
| CN | 106143486 A | 11/2016 |
| CN | 106627580 A | 5/2017 |
| CN | 106696950 A | 5/2017 |
| CN | 107953841 A | 4/2018 |
| JP | 2015218660 A | 12/2015 |

\* cited by examiner

AUTOMOBILE CHASSIS INTEGRATION CONTROL METHOD AND SYSTEM

The present application claims priority to China Patent Application No. 201711363619.9, filed on Dec. 28, 2017 and entitled "Automobile chassis Integration Control Method and System", which is hereby incorporated by reference in its entirety.

TECHNICAL FIELD

The present disclosure relates to the technical field of vehicles, and more particularly to an automobile chassis integration control method and system.

BACKGROUND

With the rapid development of modern control theory, multi-sensor information fusion, large-scale integrated circuits and other advanced technologies, and the perfect pursuit of automotive products by human society, chassis integrated control with a control goal to improve vehicle ride comfort, active safety and steering stability has become a research hot spot in the field of vehicle engineering. Through the coordination of control functions of chassis-related subsystems, the functional potential of each control module can be fully exploited, and the chassis integrated global control can be realized to improve the comprehensive performance of vehicles. However, in the whole vehicle development process, most of key electronic control key systems are individually designed and developed by various component manufacturers. They do not consider the interaction and coupling with other electronic control systems. Under certain vehicle driving conditions between various control devices, there are potential mutual interferences and effects. The existing chassis integrated control strategy is generally only for conventional two-wheel drive vehicles or hybrid vehicles, and less consideration is given to controlling the cooperation of various systems, especially it is difficult for the control of a four-drive system torque controller and the compatibility and matching of other conventional system chassis electronic control systems, resulting in low vehicle power and fuel economy.

SUMMARY

The technical problem to be solved by the present disclosure is to provide an automobile chassis integration control method and system, which effectively improves the vehicle power, the fuel economy, the passability, and the steering stability.

In order to solve the above technical problem, the present disclosure provides an automobile chassis integration control method, which include the following steps: a cooperative control unit receives a first engine torque output by an Engine Management System (EMS), a first engine torque limiting request output by a four-drive controller, a second engine torque limiting request output by an Electronic Stability Program (ESP), and a third engine torque limiting request output by a Transmission Control Unit (TCU) from a CAN bus respectively; the cooperative control unit cooperatively controls the first engine torque limiting request, the second engine torque limiting request, the third engine torque limiting request, and the first engine torque, and outputs a second engine torque as an engine execution torque.

The EMS outputs a first engine torque according to an accelerator pedal opening degree signal and a vehicle running state signal; the four-drive controller outputs a first engine torque limiting request according to a torque manager oil temperature signal, a clutch disc temperature signal, and a front-rear axle speed difference signal; the ESP outputs a second engine torque limiting request according to a driving mode signal and a vehicle running state signal; and the TCU outputs a third engine torque limiting request according to a driving mode signal, an accelerator pedal signal, a vehicle running state signal, and an own temperature protection limiting request.

The four-drive controller obtains corresponding engine torque limiting sub-requests according to the torque manager oil temperature signal, the clutch disc temperature signal and the front-rear axle speed difference signal respectively, and selects a maximum value as the first engine torque limiting request to be sent to the CAN bus.

After the four-drive controller acquires the torque manager oil temperature signal, it is first judged whether a torque manager oil temperature is greater than a first temperature threshold, and if the torque manager oil temperature is smaller than the first temperature threshold, a torque manager first target torque is output; if the torque manager oil temperature is greater than the first temperature threshold, it is further judged whether the torque manager oil temperature is greater than a second temperature threshold, if the torque manager oil temperature is smaller than the second temperature threshold, a first engine torque limiting sub-request is output, if the torque manager oil temperature is greater than the second temperature threshold, it is further judged whether the torque manager oil temperature is greater than a third temperature threshold, if the torque manager oil temperature is smaller than the third temperature threshold, a second engine torque limiting sub-request is output, and if the torque manager oil temperature is greater than the third temperature threshold, a third engine torque limiting sub-request is output.

After the four-drive controller acquires the clutch disc temperature signal, it is judged whether a clutch disc temperature is greater than a fourth temperature threshold, if the clutch disc temperature is smaller than the fourth temperature threshold, a torque manager first target torque is output, and if the clutch disc temperature is greater than the fourth temperature threshold, a fourth engine torque limiting sub-request is output.

After the four-drive controller acquires the front-rear axle speed difference signal, it is judged whether a front-rear axle speed difference is greater than a fifth threshold, if the front-rear axle speed difference is smaller than the fifth threshold, a torque manager first target torque is output, and if the front-rear axle speed difference is greater than the fifth threshold, a fifth engine torque limiting sub-request is output.

The step of cooperatively controlling, by the cooperative control unit, the first engine torque limiting request, the second engine torque limiting request, the third engine torque limiting request, and the first engine torque specifically includes following steps: a maximum value in the first engine torque limiting request, the second engine torque limiting request and the third engine torque limiting request is selected; and a difference between the maximum value and the first engine torque is calculated to obtain a second engine torque as an engine execution torque.

In an embodiment, the control method further includes: the cooperative control unit acquires a torque manager first target torque output by the four-drive controller and a torque manager intervention torque output by the ESP from the CAN bus, cooperatively controls the torque manager first target torque and the torque manager intervention torque, and outputs a torque manager execution torque.

The step of cooperatively controlling the torque manager first target torque and the torque manager intervention torque specifically includes: if the torque manager intervention torque output by the ESP is received, the torque manager intervention torque is taken as the torque manager execution torque, and otherwise, the torque manager first target torque is taken as the torque manager execution torque.

According to an embodiment, the present disclosure also provides an automobile chassis integration control system, which includes: an EMS, configured to output a first engine torque; a four-drive controller, configured to output a first engine torque limiting request; an ESP, configured to output a second engine torque limiting request; a TCU, configured to output a third engine torque limiting request; and a cooperative control unit, configured to cooperatively control the first engine torque, the first engine torque limiting request, the second engine torque limiting request and the third engine torque limiting request respectively received from a CAN bus, and output a second engine torque as an engine execution torque.

The four-drive controller obtains corresponding engine torque limiting sub-requests according to the torque manager oil temperature signal, the clutch disc temperature signal and the front-rear axle speed difference signal respectively, and selects a maximum value as the first engine torque limiting request to be sent to the CAN bus.

After the four-drive controller acquires the torque manager oil temperature signal, it is first judged whether a torque manager oil temperature is greater than a first temperature threshold, and if the torque manager oil temperature is smaller than the first temperature threshold, a torque manager first target torque is output; if the torque manager oil temperature is greater than the first temperature threshold, it is further judged whether the torque manager oil temperature is greater than a second temperature threshold, if the torque manager oil temperature is smaller than the second temperature threshold, a first engine torque limiting sub-request is output, if the torque manager oil temperature is greater than the second temperature threshold, it is further judged whether the torque manager oil temperature is greater than a third temperature threshold, if the torque manager oil temperature is smaller than the third temperature threshold, a second engine torque limiting sub-request is output, and if the torque manager oil temperature is greater than the third temperature threshold, a third engine torque limiting sub-request is output.

After the four-drive controller acquires the clutch disc temperature signal, it is judged whether a clutch disc temperature is greater than a fourth temperature threshold, if the clutch disc temperature is smaller than the fourth temperature threshold, a torque manager first target torque is output, and if the clutch disc temperature is greater than the fourth temperature threshold, a fourth engine torque limiting sub-request is output.

After the four-drive controller acquires the front-rear axle speed difference signal, it is judged whether a front-rear axle speed difference is greater than a fifth threshold, if the front-rear axle speed difference is smaller than the fifth threshold, a torque manager first target torque is output, and if the front-rear axle speed difference is greater than the fifth threshold, a fifth engine torque limiting sub-request is output.

The cooperative control unit is specifically configured to select a maximum value in the first engine torque limiting request, the second engine torque limiting request and the third engine torque limiting request; and calculate a difference between the maximum value and the first engine torque to obtain a second engine torque as an engine execution torque.

The four-drive controller is further configured to output a torque manager first target torque, the ESP is further configured to output a torque manager intervention torque, and the cooperative control unit is further configured to acquire the torque manager first target torque and the torque manager intervention torque from the CAN bus, take the torque manager intervention torque as a torque manager execution torque when receiving the torque manager intervention torque output by the ESP, and otherwise, take the torque manager first target torque as the torque manager execution torque.

The control system further includes a Continuous Damping Control (CDC), configured to adjust a damping mode in real time according to a driving mode signal and a Vehicle Dynamics Control (VDC) signal, and interact relevant information to the CAN bus.

The above embodiments of the present disclosure have the beneficial effects that through cooperative work of all systems, various kinds of performance like the fuel economy, the dynamic performance and the steering stability of vehicles are effectively improved; a multi-parameter, multilayer and multistage torque-limiting control strategy is implemented; and according to features of an oil temperature, a disc temperature and a speed difference, it is properly layered and properly graded to ensure that the performance of the whole vehicle and the service life of parts are comprehensively optimal.

BRIEF DESCRIPTION OF THE DRAWINGS

In order to more clearly illustrate the embodiments of the present disclosure or the technical solutions in the conventional art, the drawings used in the description of the embodiments or the conventional art will be briefly described below. It is apparent that the drawings in the following description are only some embodiments of the present disclosure, and other drawings can be obtained from those skilled in the art according to these drawings without any creative work.

DETAILED DESCRIPTION OF THE EMBODIMENTS

The following description of various embodiments is provided to illustrate implementable specific embodiments of the present disclosure with reference to the drawings.

Figure 1:
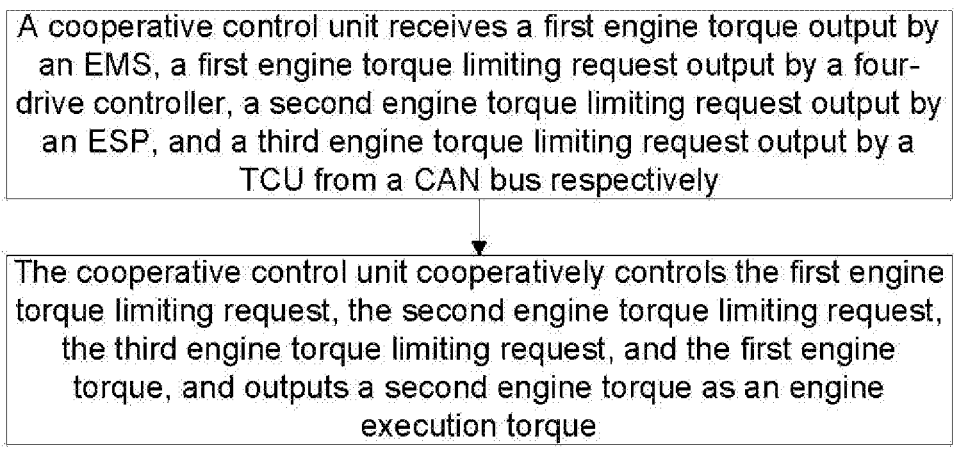
FIG. 1 is a flowchart of an automobile chassis integration control method according to Embodiment 1 of the present disclosure.

Referring to FIG. 1, Embodiment 1 of the present disclosure provides an automobile chassis integration control method, which includes the steps as follows.

A cooperative control unit receives a first engine torque output by an EMS, a first engine torque limiting request output by a four-drive controller, a second engine torque limiting request output by an ESP, and a third engine torque limiting request output by a TCU from a CAN bus respectively.

The cooperative control unit cooperatively controls the first engine torque limiting request, the second engine torque limiting request, the third engine torque limiting request, and the first engine torque, and outputs a second engine torque as an engine execution torque.

Specifically, after the vehicle is started, a vehicle electrical and electronic device such as a vehicle speed sensor, a driving mode knob position sensor, an accelerator pedal sensor, a brake pedal sensor, a steering wheel angle and a wheel speed sensor are in a power supply preparation state, and the collected information is transmitted to the CAN bus, and continuously updated. A driver operates a driving mode knob, an accelerator pedal, a brake pedal and a steering wheel through an operating mechanism to implement different driving intentions. The CAN bus transmits the signals such as the driving mode signal, the accelerator pedal signal, the brake pedal signal, the steering wheel angle signal and a vehicle running state to each control unit as the decision basis of each control unit.

Figure 2:
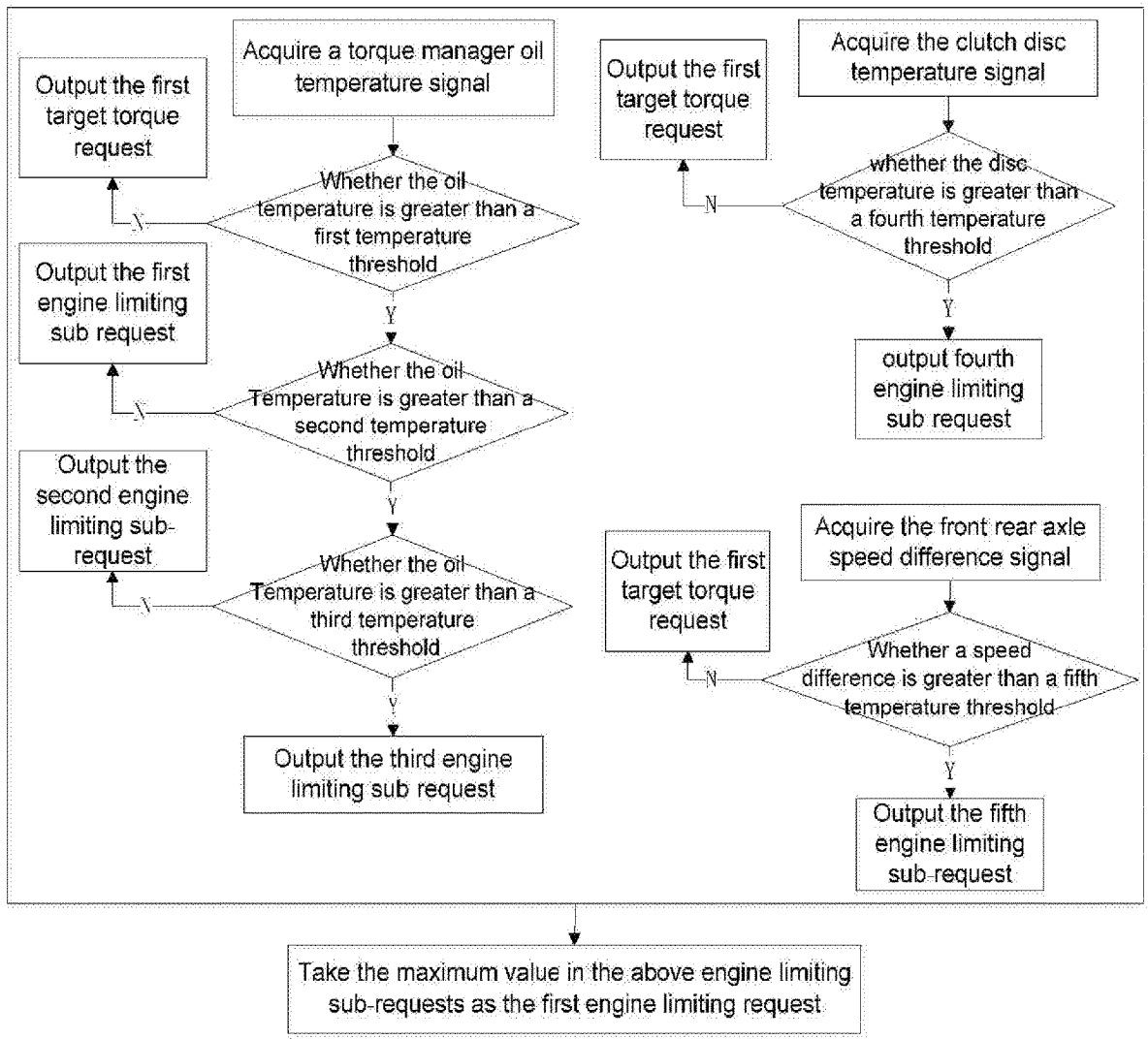
FIG. 2 is a specific flowchart of an automobile chassis integration control method according to Embodiment 1 of the present disclosure.

As shown in FIG. 2, the four-drive controller (i-4WD) intelligently decides that a rear axle outputs a first target torque according to a driving mode signal, an accelerator pedal opening degree signal, a steering wheel angle signal, an engine speed signal, an engine torque signal, a vehicle speed signal, a wheel speed signal, and an ESP request limit signal; moreover, a torque first engine torque limiting request is output according to a torque manager oil temperature signal, a clutch disc temperature signal and a front-rear axle speed difference signal, and is interacted to the CAN bus. Specifically includes the following steps.

1. After the torque manager oil temperature signal is acquired, it is first judged whether a torque manager oil temperature is greater than a first temperature threshold, and if the torque manager oil temperature is smaller than the first temperature threshold, a torque manager does not perform engine torque limiting, and a torque manager first target torque is output; if the torque manager oil temperature is greater than the first temperature threshold, it is further judged whether the torque manager oil temperature is greater than a second temperature threshold, if the torque manager oil temperature is smaller than the second temperature threshold, a first engine torque limiting sub-request (Engine_limitinga1) is output, if the torque manager oil temperature is greater than the second temperature threshold, it is further judged whether the torque manager oil temperature is greater than a third temperature threshold, if the torque manager oil temperature is smaller than the third temperature threshold, a second engine torque limiting sub-request (Engine_limitinga2) is output, and if the torque manager oil temperature is greater than the third temperature threshold, a third engine torque limiting sub-request (Engine_limitinga3) is output. The above limiting request value changes with the temperature change. Generally speaking, the higher the temperature, the more severe the torque limiting.

2. After the clutch disc temperature signal is acquired, it is judged whether a clutch disc temperature is greater than a fourth temperature threshold, if the clutch disc temperature is smaller than the fourth temperature threshold, the torque manager does not perform engine torque limiting, and a torque manager first target torque is output; and if the clutch disc temperature is greater than the fourth temperature threshold, a fourth engine torque limiting sub-request (Engine_limitinga4) is output. The above limiting request value changes with the temperature change. Generally speaking, the higher the temperature, the more severe the torque limiting.

3. After the front-rear axle speed difference signal is acquired, it is judged whether a front-rear axle speed difference is greater than a fifth threshold, if the front-rear axle speed difference is smaller than the fifth threshold, the torque manager does not perform engine torque limiting, and a torque manager first target torque is output, and if the front-rear axle speed difference is greater than the fifth threshold, a fifth engine torque limiting sub-request (Engine_limiting a5) is output.

The four-drive controller selects a maximum value from the above five engine torque limiting sub-requests (Engine_limiting a1, Engine_limitinga2, Engine_limiting a3, Engine_limiting a4, Engine_limiting a5) as the first engine torque limiting request (Engine limiting Req1) to be sent to the CAN bus.

The EMS outputs the first engine, torque (Engine Torque1) according to an accelerator pedal opening signal and a vehicle running state signal, and interacts it to the CAN bus.

The ESP outputs a torque manager intervention torque and a second engine torque limiting request (Engine limiting Req2) according to a driving mode signal, a vehicle speed signal, a lateral acceleration signal, a wheel speed signal, a yaw velocity and a four-drive rear-axle torque signal, and interacts relevant information to the CAN bus.

A TCU outputs a third engine torque limiting request (Engine limiting Req3) according to a driving mode signal, an accelerator pedal opening degree signal, a vehicle speed, an accelerated speed and an own temperature protection limiting requirement, executes gear-shifting control logic, and interacts relevant information to the CAN bus.

A CDC adjusts a damping mode (Soft, Normal, Hard) in real time according to a driving mode signal and a VDC signal, and interacts relevant information to the CAN bus.

Figure 3:
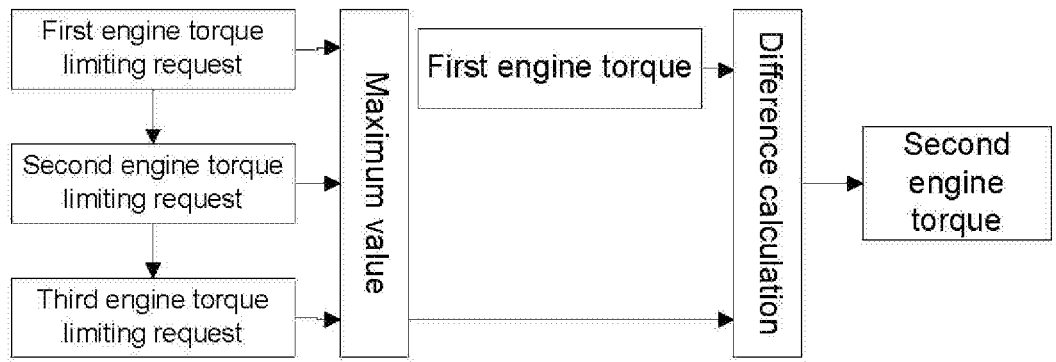
FIG. 3 is a flowchart of outputting a first engine torque limiting request from a four-drive controller according to Embodiment 1 of the present disclosure.
Figure 4:
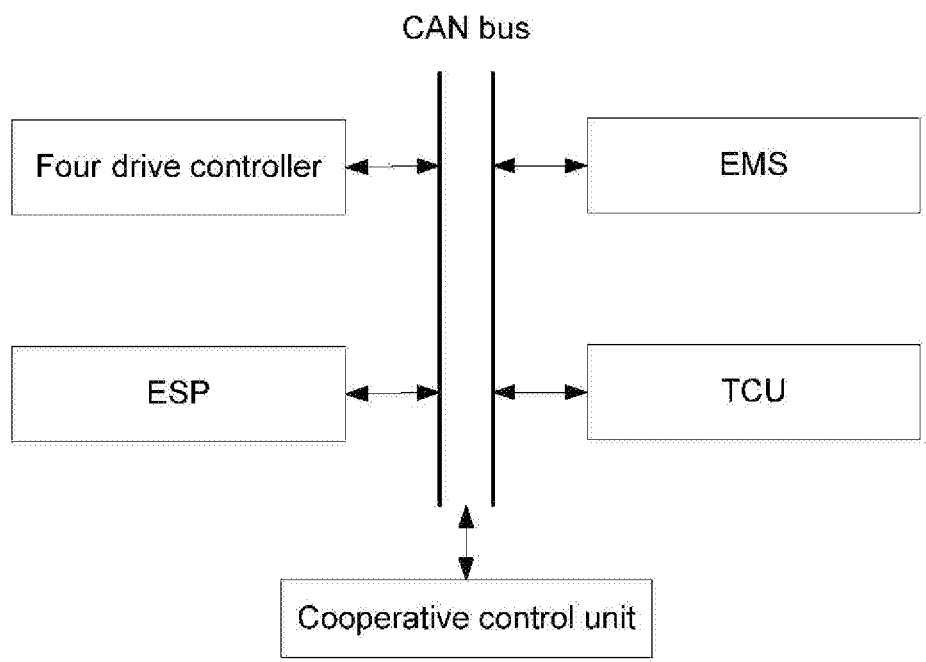
FIG. 4 is a structural schematic diagram of an automobile chassis integration control system according to Embodiment 2 of the present disclosure.

As shown in FIG. 3, the operation of acquiring, by the cooperative control unit, the first engine torque limiting request, the second engine torque limiting request and the third engine torque limiting request from the CAN bus and cooperatively controlling the requests specifically includes: selecting a maximum value thereamong; and calculating a difference between the maximum value and the first engine torque output by the EMS to obtain a second engine torque (Engine Torque2) as an engine execution torque, that is, Engine Torque 2=Engine Torque 1−max(Engine limiting Req1, Engine limiting Req2, Engine limiting Req3)

The operation of acquiring a torque manager first target torque output by the four-drive controller and a torque manager intervention torque output by the ESP from the CAN bus and cooperatively controlling the torques specifically includes: if the torque manager intervention torque output by the ESP is received, taking the torque manager intervention torque as a torque manager execution torque, and otherwise, taking the torque manager first target torque as the torque manager execution torque.

In the present embodiment, the driving mode signal includes four types: a conventional driving mode signal, a comfortable driving mode signal, a control driving mode signal, and an off-road driving mode signal. After each electronic control unit obtains different driving mode signals from the CAN bus, the corresponding adjustment is performed by itself as follows:

1. Conventional driving mode; The vehicle has better fuel economy in this mode. At this time: the CDC adaptively adjusts to Normal mode, the i-4WD adaptively adjusts to Auto mode, and the TCU adaptively adjusts to ECO mode. When the vehicle is unstable/slips, the VDC and the ESP preferentially execute an engine torque limiting strategy to reduce energy consumption; when the EMS is limited, the cooperative control unit integrates the i-4WD, the VDC and the TCU to execute a maximum limiting request.

2. Comfortable driving mode: At this time: the CDC adaptively adjusts to Soft mode, the i-4WD adaptively adjusts to Auto mode, and the TCU adaptively adjusts to normal mode. When the vehicle is unstable/slips, the VDC and the ESP simultaneously execute an engine torque limiting and brake braking strategy to improve the comfort; when the EMS is limited, a cooperative layer integrates the i-4WD, the VDC and the TCU to perform a maximum limiting request to ensure the best performance of each system.

3. Control driving mode: The vehicle has good steering characteristics in this mode. At this time: the CDC adaptively adjusts to Hard mode, the i-4WD adaptively adjusts to Lock mode, and the TCU adaptively adjusts to Sport mode. When the vehicle is unstable/slips, the i-4WD preferentially transmits a maximum torque to a rear axle, thereby improving the vehicle steering characteristics and improving the steering performance. Then, the VDC and the ESP perform the cross-wheel braking as needed; when the EMS is limited, a coordinative layer integrates the i-4WD, the VDC and the TCU to perform a maximum limiting request to ensure the best performance of each system.

4. Off-road driving mode: The vehicle has good off-road performance in this mode. At this time: the CDC adaptively adjusts to Hard mode, raises the chassis clearance, and improves vehicle passability, the i-4WD adaptively adjusts to Full Lock mode, and the TCU adaptively adjusts to Sport mode. When the vehicle is unstable/slips, the i-4WD preferentially transmits a maximum torque to a rear axle, thereby improving the cross-country power of the vehicle. Then, the VDC and the ESP perform the cross-wheel braking as needed; when the EMS is limited, a coordinative layer integrates the i-4WD, the VDC and the TCU to perform a maximum limiting request to ensure the best performance of each system.

Corresponding to Embodiment 1 of the present disclosure, Embodiment 2 of the present disclosure also provides an automobile chassis integration control system, which includes: an EMS, a four-drive controller, an ESP, a TCU, and a cooperative control unit.

The EMS is configured to output a first engine torque.

The four-drive controller is configured to output a first engine torque limiting request.

The ESP is configured to output a second engine torque limiting request.

The TCU is configured to output a third engine torque limiting request.

The cooperative control unit is configured to cooperatively control the first engine torque, the first engine torque limiting request, the second engine torque limiting request and the third engine torque limiting request respectively received from a CAN bus, and output a second engine torque as an engine execution torque.

The four-drive controller obtains corresponding engine torque limiting sub-requests according to the torque manager oil temperature signal, the clutch disc temperature signal and the front-rear axle speed difference signal respectively, and selects a maximum value as the first engine torque limiting request to be sent to the CAN bus.

After the four-drive controller acquires the torque manager oil temperature signal, it is first judged whether a torque manager oil temperature is greater than a first temperature threshold, and if the torque manager oil temperature is smaller than the first temperature threshold, a torque manager first target torque is output; if the torque manager oil temperature is greater than the first temperature threshold, it is further judged whether the torque manager oil temperature is greater than a second temperature threshold, if the torque manager oil temperature is smaller than the second temperature threshold, a first engine torque limiting sub-request is output, if the torque manager oil temperature is greater than the second temperature threshold, it is further judged whether the torque manager oil temperature is greater than a third temperature threshold, if the torque manager oil temperature is smaller than the third temperature threshold, a second engine torque limiting sub-request is output, and if the torque manager oil temperature is greater than the third temperature threshold, a third engine torque limiting sub-request is output.

After the four-drive controller acquires the clutch disc temperature signal, it is judged whether a clutch disc temperature is greater than a fourth temperature threshold, if the clutch disc temperature is smaller than the fourth temperature threshold, a torque manager first target torque is output, and if the clutch disc temperature is greater than the fourth temperature threshold, a fourth engine torque limiting sub-request is output.

After the four-drive controller acquires the front-rear axle speed difference signal, it is judged whether a front-rear axle speed difference is greater than a fifth threshold, if the front-rear axle speed difference is smaller than the fifth threshold, a torque manager first target torque is output, and if the front-rear axle speed difference is greater than the fifth threshold, a fifth engine torque limiting sub-request is output.

The cooperative control unit is specifically configured to select a maximum value in the first engine torque limiting request, the second engine torque limiting request and the third engine torque limiting request; and calculate a difference between the maximum value and the first engine torque to obtain a second engine torque as an engine execution torque.

The four-drive controller is further configured to output a torque manager first target torque, the ESP is further configured to output a torque manager intervention torque, and the cooperative control unit is further configured to acquire the torque manager first target torque and the torque manager intervention torque from the CAN bus, take the torque manager intervention torque as a torque manager execution torque when receiving the torque manager intervention torque output by the ESP, and otherwise, take the torque manager first target torque as the torque manager execution torque.

The control system further includes a CDC, which is configured to adjust a damping mode in real time according to a driving mode signal and a VDC signal, and interact relevant information to the CAN bus.

As can be seen from the above description, the present disclosure has the beneficial effects that through cooperative work of all systems, various kinds of performance like the fuel economy, the dynamic performance and the steering stability of vehicles are effectively improved; a multi-parameter, multilayer and multistage torque-limiting control strategy is implemented; and according to features of an oil temperature, a disc temperature and a speed difference, it is properly layered and properly graded to ensure that the performance of the whole vehicle and the service life of parts are comprehensively optimal.

The above is only the exemplary embodiments of the present disclosure, the scope of the present disclosure is not limited thereto, and thus equivalent changes made in the claims of the present disclosure are still within the scope of the present disclosure.

What is claimed is:

1. An automobile chassis integration control method, comprising:
    receiving, by a cooperative control unit, a first engine torque output by an Engine Management System (EMS), a first engine torque limiting request output by a four-drive controller, a second engine torque limiting request output by an Electronic Stability Program (ESP), and a third engine torque limiting request output by a Transmission Control Unit (TCU) from a CAN bus respectively; and
    cooperatively controlling, by the cooperative control unit, the first engine torque limiting request, the second engine torque limiting request, the third engine torque limiting request, and the first engine torque, and outputting a second engine torque as an engine execution torque as a result of the cooperatively controlling.

2. The control method as claimed in claim 1, wherein the EMS outputs the first engine torque according to an accelerator pedal opening degree signal and a vehicle running state signal; the four-drive controller outputs the first engine torque limiting request according to a torque manager oil temperature signal, a clutch disc temperature signal, and a front-rear axle speed difference signal; the ESP outputs the second engine torque limiting request according to a driving mode signal and the vehicle running state signal; and the TCU outputs the third engine torque limiting request according to the driving mode signal, the accelerator pedal opening degree signal, the vehicle running state signal, and an own temperature protection limiting request.

3. The control method as claimed in claim 2, wherein the four-drive controller obtains corresponding engine torque limiting sub-requests according to the torque manager oil temperature signal, the clutch disc temperature feature signal and the front-rear axle speed difference signal respectively, and selects a maximum value as the first engine torque limiting request to be sent to the CAN bus.

4. The control method as claimed in claim 3, wherein after the four-drive controller acquires the torque manager oil temperature signal, it is first judged whether a torque manager oil temperature is greater than a first temperature threshold, and if the torque manager oil temperature is smaller than the first temperature threshold, a torque manager first target torque is output; if the torque manager oil temperature is greater than the first temperature threshold, it is further judged whether the torque manager oil temperature is greater than a second temperature threshold, if the torque manager oil temperature is smaller than the second temperature threshold, a first engine torque limiting sub-request is output, if the torque manager oil temperature is greater than the second temperature threshold, it is further judged whether the torque manager oil temperature is greater than a third temperature threshold, if the torque manager oil temperature is smaller than the third temperature threshold, a second engine torque limiting sub-request is output, and if the torque manager oil temperature is greater than the third temperature threshold, a third engine torque limiting sub-request is output;
    after the four-drive controller acquires the clutch disc temperature signal, it is judged whether a clutch disc temperature is greater than a fourth temperature threshold, if the clutch disc temperature is smaller than the fourth temperature threshold, the torque manager first target torque is output, and if the clutch disc temperature is greater than the fourth temperature threshold, a fourth engine torque limiting sub-request is output; and
    after the four-drive controller acquires the front-rear axle speed difference signal, it is judged whether a front-rear axle speed difference is greater than a fifth threshold, if the front-rear axle speed difference is smaller than the fifth threshold, the torque manager first target torque is output, and if the front-rear axle speed difference is greater than the fifth threshold, a fifth engine torque limiting sub-request is output.

5. The control method as claimed in claim 1, wherein cooperatively controlling, by the cooperative control unit, the first engine torque limiting request, the second engine torque limiting request, the third engine torque limiting request, and the first engine torque specifically comprises:
    selecting a maximum value in the first engine torque limiting request, the second engine torque limiting request and the third engine torque limiting request; and
    calculating a difference between the maximum value and the first engine torque to obtain the second engine torque as the engine execution torque.

6. The control method as claimed in claim 1, further comprising:
    acquiring, by the cooperative control unit, a torque manager first target torque output by the four-drive controller and a torque manager intervention torque output by the ESP from the CAN bus, cooperatively controlling the torque manager first target torque and the torque manager intervention torque, and outputting a torque manager execution torque.

7. The control method as claimed in claim 6, wherein cooperatively controlling the torque manager first target torque and the torque manager intervention torque specifically comprises:
    if the torque manager intervention torque output by the ESP is received, taking the torque manager intervention torque as the torque manager execution torque, and otherwise, taking the torque manager first target torque as the torque manager execution torque.

8. An automobile chassis integration control system, comprising:
    an Engine Management System (EMS), configured to output a first engine torque;
    a four-drive controller, configured to output a first engine torque limiting request;
    an Electronic Stability Program (ESP), configured to output a second engine torque limiting request;
    a Transmission Control Unit (TCU), configured to output a third engine torque limiting request; and
    a cooperative control unit, configured to cooperatively control the first engine torque, the first engine torque limiting request, the second engine torque limiting request and the third engine torque limiting request respectively received from a CAN bus, and output a second engine torque as an engine execution torque as a result of the cooperative control.

9. The control system as claimed in claim 8, wherein the four-drive controller obtains corresponding engine torque limiting sub-requests according to a torque manager oil temperature signal, a clutch disc temperature signal and a front-rear axle speed difference signal respectively, and selects a maximum value as the first engine torque limiting request to be sent to the CAN bus.

10. The control system as claimed in claim 9, wherein after the four-drive controller acquires the torque manager oil temperature signal, it is first judged whether a torque manager oil temperature is greater than a first temperature threshold, and if the torque manager oil temperature is smaller than the first temperature threshold, a torque manager first target torque is output; if the torque manager oil temperature is greater than the first temperature threshold, it is further judged whether the torque manager oil temperature is greater than a second temperature threshold, if the torque manager oil temperature is smaller than the second temperature threshold, a first engine torque limiting sub-request is output, if the torque manager oil temperature is greater than the second temperature threshold, it is further judged whether the torque manager oil temperature is greater than a third temperature threshold, if the torque manager oil temperature is smaller than the third temperature threshold, a second engine torque limiting sub-request is output, and if the torque manager oil temperature is greater than the third temperature threshold, a third engine torque limiting sub-request is output;

after the four-drive controller acquires the clutch disc temperature signal, it is judged whether a clutch disc temperature is greater than a fourth temperature threshold, if the clutch disc temperature is smaller than the fourth temperature threshold, the torque manager first target torque is output, and if the clutch disc temperature is greater than the fourth temperature threshold, a fourth engine torque limiting sub-request is output; and after the four-drive controller acquires the front-rear axle speed difference signal, it is judged whether a front-rear axle speed difference is greater than a fifth threshold, if the front-rear axle speed difference is smaller than the fifth threshold, the torque manager first target torque is output, and if the front-rear axle speed difference is greater than the fifth threshold, a fifth engine torque limiting sub-request is output.

11. The control system as claimed in claim 8, wherein the cooperative control unit is specifically configured to select a maximum value in the first engine torque limiting request, the second engine torque limiting request and the third engine torque limiting request; and calculate a difference between the maximum value and the first engine torque to obtain the second engine torque as the engine execution torque.

12. The control system as claimed in claim 8, wherein the four-drive controller is further configured to output a torque manager first target torque, the ESP is further configured to output a torque manager intervention torque, and the cooperative control unit is further configured to acquire the torque manager first target torque and the torque manager intervention torque from the CAN bus, take the torque manager intervention torque as a torque manager execution torque when receiving the torque manager intervention torque output by the ESP, and otherwise, take the torque manager first target torque as the torque manager execution torque.

13. The control system as claimed in claim 8, further comprising a Continuous Damping Control (CDC), configured to adjust a damping mode in real time according to a driving mode signal and a Vehicle Dynamics Control (VDC) signal, and interact relevant information to the CAN bus.

* * * * *